May 10, 1966   B. L. CORSON ETAL   3,250,520
VIBRATORY KILN

Original Filed Feb. 26, 1962   7 Sheets-Sheet 1

INVENTORS:
BOLTON L. CORSON
CLIFTON A. DANFORTH
BY Howson & Howson
ATTYS.

May 10, 1966   B. L. CORSON ET AL   3,250,520
VIBRATORY KILN

Original Filed Feb. 26, 1962   7 Sheets-Sheet 2

INVENTORS.
BOLTON L. CORSON
CLIFTON A. DANFORTH
BY *Howson & Howson*
ATTYS.

May 10, 1966  B. L. CORSON ETAL  3,250,520

VIBRATORY KILN

Original Filed Feb. 26, 1962  7 Sheets-Sheet 3

INVENTORS:
BOLTON L. CORSON
CLIFTON A. DANFORTH
BY Howson & Howson
ATTYS.

May 10, 1966  B. L. CORSON ET AL  3,250,520

VIBRATORY KILN

Original Filed Feb. 26, 1962   7 Sheets-Sheet 4

INVENTORS:
BOLTON L. CORSON
CLIFTON A. DANFORTH
BY Howson & Howson
ATTYS.

May 10, 1966   B. L. CORSON ETAL   3,250,520
VIBRATORY KILN
Original Filed Feb. 26, 1962   7 Sheets-Sheet 6

INVENTORS:
BOLTON L. CORSON
CLIFTON A. DANFORTH
BY Howson & Howson
ATTYS.

May 10, 1966 B. L. CORSON ETAL 3,250,520
VIBRATORY KILN
Original Filed Feb. 26, 1962 7 Sheets-Sheet 7

INVENTORS:
BOLTON L. CORSON
CLIFTON A. DANFORTH
BY
Howson & Howson
ATTYS.

United States Patent Office 3,250,520
Patented May 10, 1966

3,250,520
VIBRATORY KILN
Bolton L. Corson, Plymouth Meeting, and Clifton A. Danforth, Philadelphia, Pa., assignors to G. & W. H. Corson, Incorporated, Plymouth Meeting, Pa., a corporation of Delaware
Continuation of application Ser. No. 175,479, Feb. 26, 1962. This application Sept. 30, 1964, Ser. No. 402,689
17 Claims. (Cl. 263—21)

This is a continuation of co-pending application Serial No. 175,479, filed February 26, 1962, now abandoned.

The present invention relates generally to apparatus and methods for calcining mineral materials by combustion within a mass of material in a calcining zone wherein the pieces of the material are mechanically intermixed as they progress through the calcining zone.

More particularly, the present device is adapted for calcining limestone pieces in such a manner that uniformity of heat treatment is provided with a high degree of efficiency and with rapidity.

A still further object of the present invention is to provide apparatus and a method for calcining of materials such as pieces of limestone in such a manner as to give uniform and controlled burning or calcining of the pieces to provide uniformity of calcining and at the same time have a high production capacity in an entirely new and different type of kiln.

A further object of the present invention is to provide a method and apparatus for heat treatment of material, such as pieces of limestone, such treatment being effected in an entirely new and different manner, overcoming known deficiencies and drawbacks in heretofore used rotary vertical shaft and fluidized bed kilns while at the same time obtaining the beneficial advantages of the various known types of kilns.

The present method and apparatus are particularly useful for calcining of limestone and the hereinafter described embodiment of the apparatus will be particularly directed to a device for calcining or burning limestone. This is merely for illustrative purposes, however, and manifestly the device can be used for many other operations and processes including sintering and heat treating non-combustible particle whiles mixing with a combustible product and during such mixing burning the combustible material within a bed of the same.

Present prevalent methods of burning or calcining limestone and the like involve the use of shaft kilns, rotary kilns or fluidized bed methods. Each of these types have serious disadvantages and drawbacks, even though substantially universally utilized for their purpose in the trade.

With respect to vertical shaft kilns, it has been found that even distribution of heat is difficult to obtain and channeling often occurs with a resultant uneven heat through the body of the material. This uneven heat results in nonuniformity of burning of the limestone, often resulting in over burning and/or under burning or individual pieces of the material being treated. Such vertical shaft kilns do, however, have a favorable fuel ratio to quantity of material treated, which is a desirable characteristic.

As regards rotary kilns currently in use, one of the drawbacks is the high initial investment required for the device. Rotary kilns also have a very poor fuel ratio to quantity of material treated due to the fact that heat transfer is largely by radiation from flame and hot gases.

Kilns of a fluids-solids type operate in a manner in which finely ground material is kept in a fluidized state by means of pressurized gas or air. This type is not widely used for limestone since it can only be used successfully with an extremely small percent of existing limestone, because it must be of a type which will withstand the severe abrasions which takes place in the fluidizing action sufficiently to reduce material stack losses to a point to which the process is economically acceptable. This type of kiln is also high in initial cost, and with high power requirements, and even with a special type of stone has high stack losses.

The present invention therefore has as its primary object the provision of apparatus and a method for the calcining of limestone of a relatively large piece size in a manner which will produce lime of very high quality, while overcoming the disadvantages and drawbacks of rotary, shaft and fluid-solid type kilns.

A further object of the present invention is to provide a kiln or the like having a good fuel to product ratio, resulting in low cost of operation.

It is likewise an object of the invention to provide a highly effective kiln in which the initial cost of the equipment is substantially less than in other types of kilns, and has a high product capacity in small units as distinguished from existing types of vertical shaft and rotary kilns.

Another object of the invention is to provide a device of the character described which can, if desired, eliminate the use of refractory materials to thereby decrease maintenance costs for the apparatus.

Another object is to provide a device susceptible of wholly automatic and controlled operation which will substantially reduce labor costs.

An additional object of the invention is to provide a lime kiln or the like having a very short time period of treatment of the material, particularly as compared with types presently in use, and which provides a thorough mixing of the individual pieces due to the construction and type of operation, including a controlled vibratory action or motion of the kiln, and which decreases in time of motion and movement of stones with respect to one another results from treating small pieces and with rapid heat transfer and this short treatment time reduces abrading and attrition of the materials.

It is an additional object of the invention to provide apparatus and method for calcining of limestone wherein shutdown time is very substantially less than that required for relining or patching shaft kilns, and which provides ease and flexibility of start-up and shutdown time, and wherein any dust can be recirculated back into the kiln for additional treatment resulting in higher percentage output of finalized product.

Another object of the present invention is to provide apparatus and method for the calcining of large particles or pieces of limestone, utilizing movement of a large mass thereof through the calcining zone while subjecting the same to a particular type of vibration or shaking so that all limestone pieces are substantially evenly treated and burning fuel within the bed in the absence of fluidizing the same, and wherein the temperature of combustion can be readily controlled and maintained at a low temperature.

Other and additional advantages and objects of the invention will be more readily apparent from the following detailed description of an embodiment thereof when taken together with the accompanying drawings in which:

Figures 1, 2:
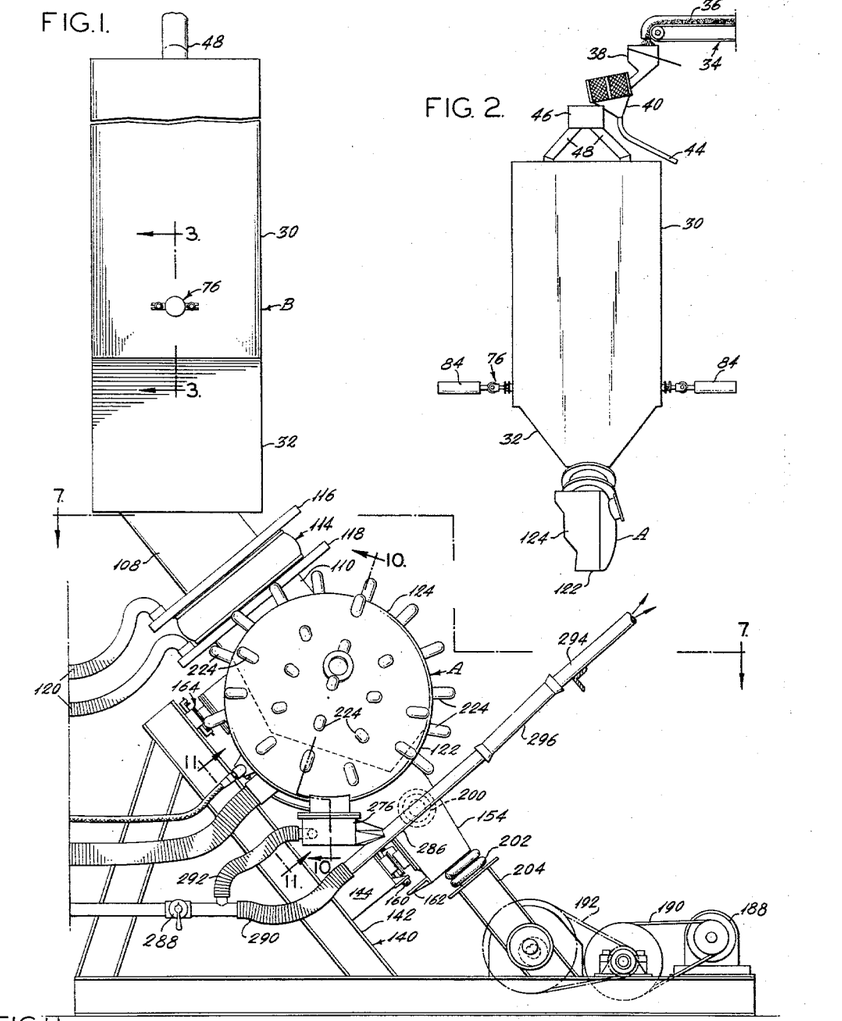
FIG. 1 is a side elevational view of the main portion of the apparatus of the present invention.
FIG. 2 is a fragmentary front elevational view of a preheater section of the apparatus and material feed in portion.

Referring now in detail to the drawings, which show an apparatus particularly suitable for calcining of minerals such as limestone, which is illustrative of one type of treatment which can be effected in the present apparatus, but obviously not confined thereto, the apparatus includes generally a calcining section A and a preheating section B (FIG. 1). The preheater section B is stationarily mounted by any suitable means, not shown, and will be described in detail with reference to FIGS. 2-6 inclusive. The calcining section A is mounted for vibratory movement along a substantially straight or linear path at an angle to the ground or vertical as will be described later, and means are provided for imparting such vibratory motion to this section either constantly or preferably in intermittent time cycles of operation, as will be described with respect to FIGS. 7, 8 and 16-19.

The preheating section includes a vertically disposed container 30 having a discharge portion 32 which is gradually constricted toward the junction point or discharge point into the calciner or kiln section. A conveyor apparatus 34 consisting of continuous belt or the like, is operated to continuously carry pieces of limestone such as at 36 and discharge them into a hopper 38 which deposits them into a sizer 40 having a rotating seive screen 42 which takes, fines and discharges them through conduit 44, while the remainder of the material of a given predetermined minimum size is deposited in hopper 46 which then through tube conduits 48 discharges the material into the container 30.

Figure 3:
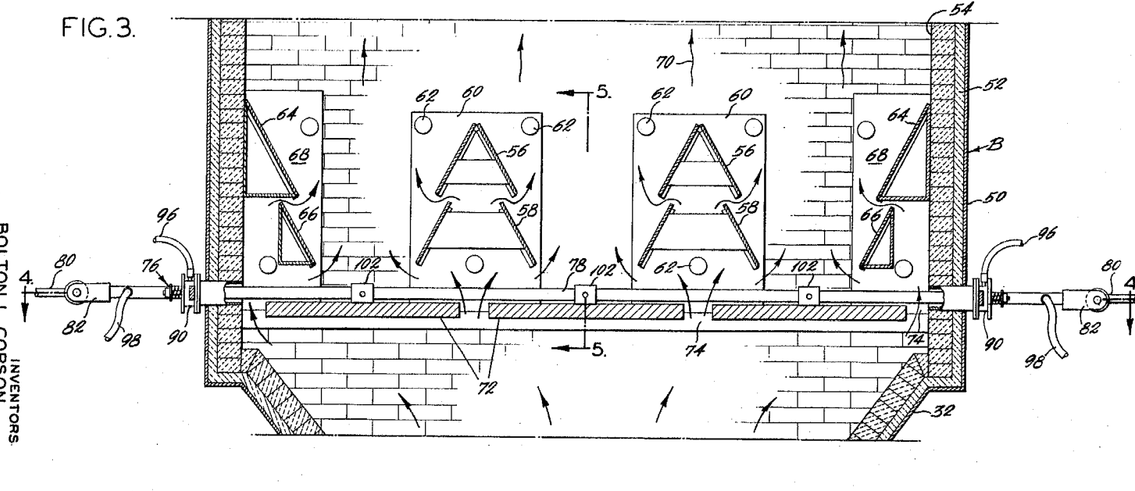
FIG. 3 is a fragmentary sectional view taken on line 3—3 of FIG. 1.
Figure 4:
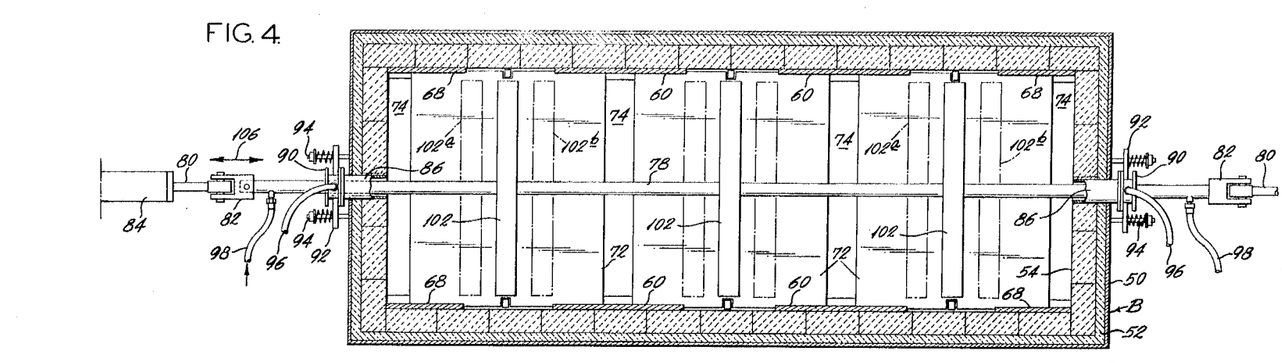
FIG. 4 is a sectional plan view taken on line 4—4 of FIG. 3.
Figure 5:
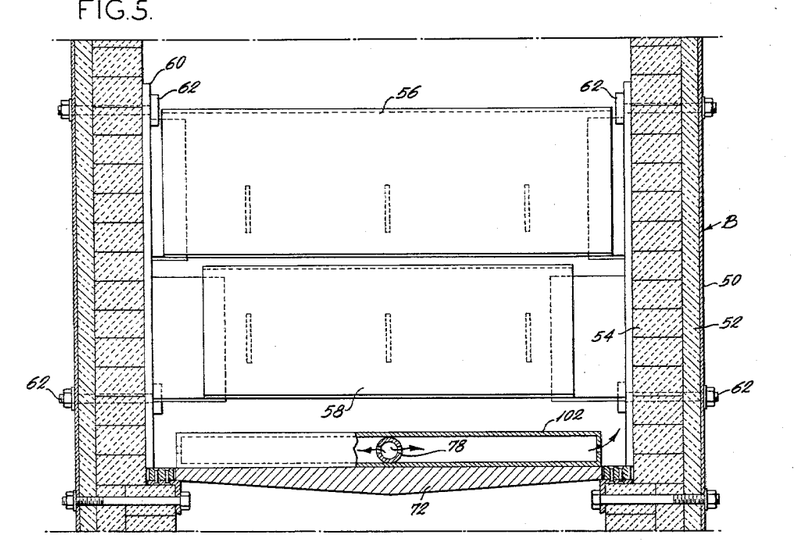
FIG. 5 is a fragmentary elevational sectional view taken on line 5—5 of FIG. 3.

The container 30 as shown in detail in FIGS. 3-5 inclusive, consists of an outer casing 50, a layer of suitable insulation 52 and a liner 54 of a refractory brick or the like of a known type. A series of baffles extend transversely across the interior of the container, including upper and lower baffles 56 and 58 centrally disposed mounted by means of plates 60 secured to the walls of the container by bolts or the like 62. It will be noted that the upper baffles 56 are closed at the top and of a substantially A shaped cross-section, whereas the lower baffles 58 are separated or open at their tops for purposes hereinafter to be set forth. Identical end baffles are likewise mounted in the container consisting of upper and lower baffles 64 and 66 respectively, and mounted at each end by means of plates 68 in a manner similar to plates 60. It will again be noted that plate 64 and plate 66 are separated intermediate the upper and lower ends thereof. These separations in the plates as also the open upper ends of baffles 58 are to permit circulation of air from the calciner section, consisting of the hot combustion air up through the preheater as indicated by arrows at 70. A series of spaced plates 72 are transversely mounted below the baffles and extend across the width of the container below these baffles, but with openings therebetween positioned below the centers of the central baffles and spaced from the side walls of the container as shown in FIG. 3. This spaced arrangement of the various components permits the hot combustion air to circulate freely as indicated by the arrows and through material deposited in the container prior to its discharge into the calcining section for calcining or burning.

Figure 6:
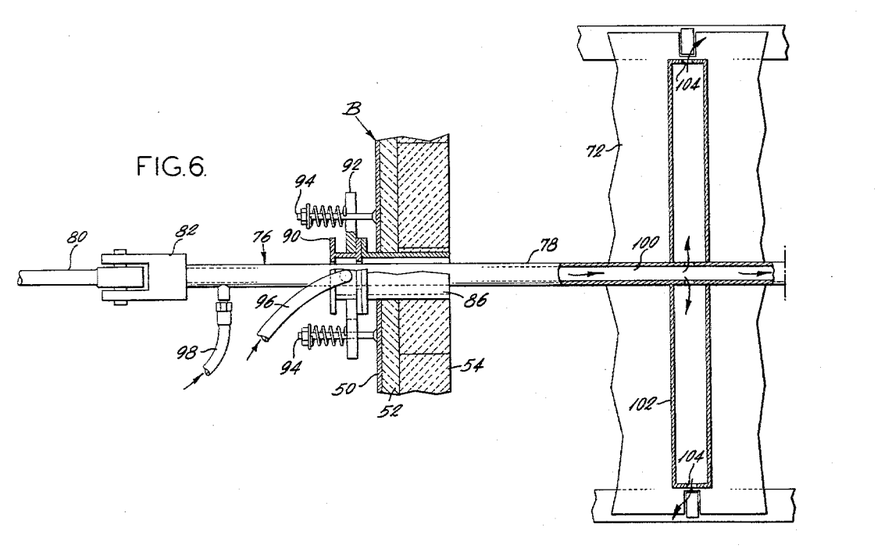
FIG. 6 is an enlarged fragmentary view of air and gas medium introduction and distributing means.
Figures 7, 8, 9:
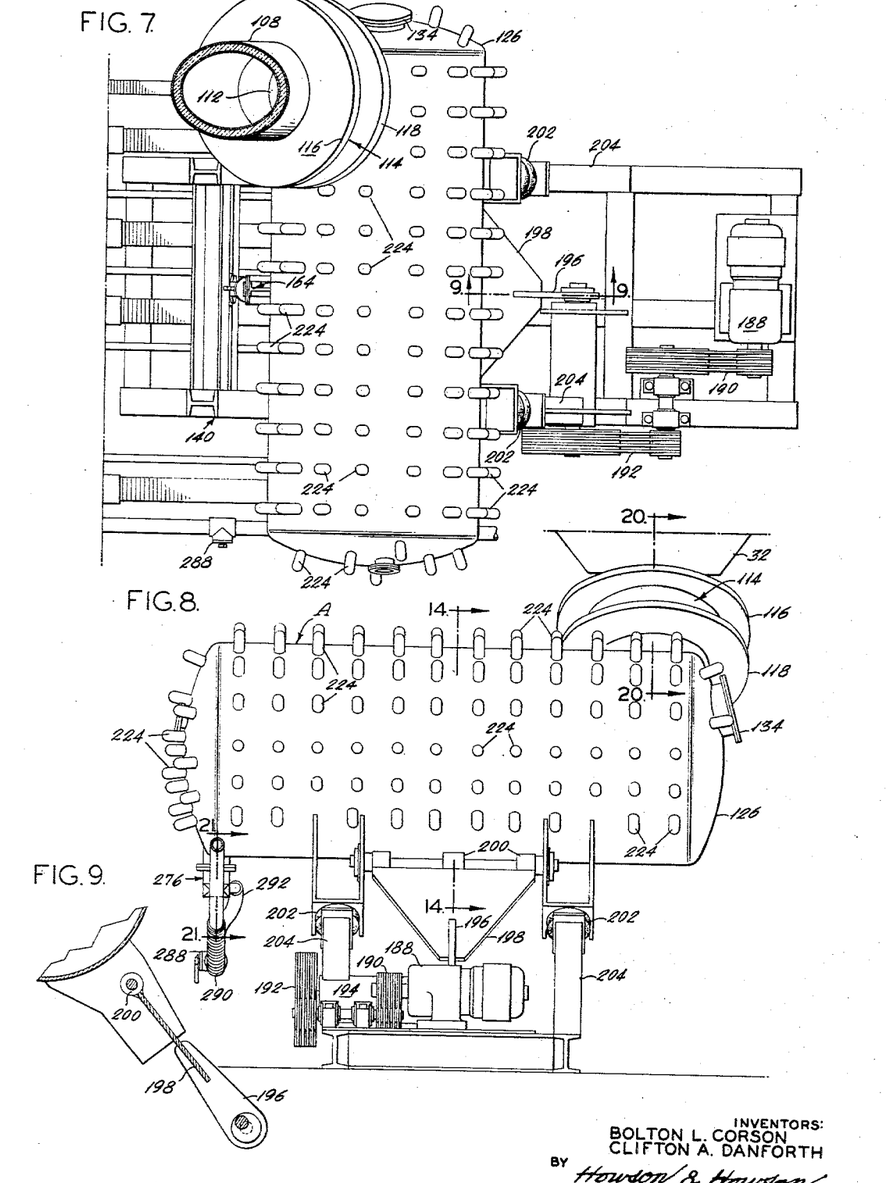
FIG. 7 is a top plan view of the calciner apparatus taken on line 7—7 of FIG. 1.
FIG. 8 is a front elevational view taken at right angles to FIG. 7.
FIG. 9 is a fragmentary sectional view taken on line 9—9 of FIG. 7.

The spacing between the plates 72 is indicated at 74 and also the plates are spaced from the ends of the container as seen in FIGS. 3 and 4. In operation, the material such as pieces of limestone fed into the container through the conduits 48 will drop down to the level of the material in the container passing around the various series of baffles and come to rest on the tops of the plates where it will tend to pile upon the top of the plate but spaced from the edges thereof or from the openings therebetween. Means are provided for then so moving the pieces as to place them over the openings for discharge therethrough into the discharge portion 32 of the container. Reference is here made to FIGS. 3 and 4 where a so called rake assembly is generally designated 76. A tube 78 extends through the container below the lowermost portions of the baffles and above the upper level of the plates 72. The ends of these tubes 78 are connected to rods 80 by fittings 82. Rods 80 are connected into pneumatic piston and cylinder units 84 adapted to reciprocate the tube 78 with respect to the container upon actuation of the piston and cylinder units by any known means. As shown in FIG. 6 hollow sleeves 86 extend through the side walls of the container and are secured therein in any desired manner such as by fittings 88 or the like. These sleeves are of larger interior diameter then the exterior diameter of tube 78. A hollow fitting 90 surrounds the tube 78 outwardly from the outer end of sleeve 86 and are spring biased to air-tight contact by means of plates 92 and rod and spring assemblies 94. The fittings 90 are in the nature of air inlet fittings and have small openings 94 through which the tube fits and in spaced relation with one another.

Conduits 96 open into the fittings 90 and are connected to a suitable source of air under pressure. Air introduced through conduits 96 serves, due to the openings provided, to cool the sleeves 86 and tubes passing therethrough as also to clean material therefrom which otherwise might clog the arrangement and prevent efficient operation. Conduits 98 connect into the open interior of tubes 78 (FIG. 6) and also are connected to a suitable source of cooling air adapted to insert the same and flow it through the tube as indicated by arrows at 100. At spaced intervals along the length of the tube 78 interiorly of the container of the preheater rectangular shaped hollow scrapers or rakes 102 are fitted around and secured to the tube 78 extending substantially across the width of the interior of the container and having openings 104 in the ends thereof. In a neutral position as shown in full lines at 102 in FIG. 4, these scrapers or rakes 102 are substantially intermediate the side edges of the plates 72. Upon actuation of the piston and cylinder units 84 as indicated by arrow 106 in FIG. 4, the rakes 102 will be pulled and move to the dotted line positions 102A or 102B and thereby move or scrape the pieces of materials being treated into the openings 74 for passage down through the throat 32 into the calcining unit. The air introduced into tube 78 serves to cool this tube as also the rakes into which it passes, and thence through the openings 104.

The hot combustion air, as is shown by the arrows 70 in FIG. 3, is not hindered in its passage upwardly through the preheater due to the spacing of the baffles and will flow up through material therein to pre-heat it by use of the hot combustion gases or air from the calciner unit where the burning is taking place. The rate of feed from the preheater into the calciner unit can of course be governed dependent upon the stroke and frequency of stroke of the scrapers by actuation of rod 80 in an understandable manner. This rate of feed is carefully correlated with the duration of treatment desired in the calciner since feed through the calciner is governed in large measure by the rate of speed of feed from the preheater into the calciner. For some operations, a preheater might not be necessary but for calcining of limestone has proven very desirable and satisfactory in operation to give optimum results.

Figure 20:
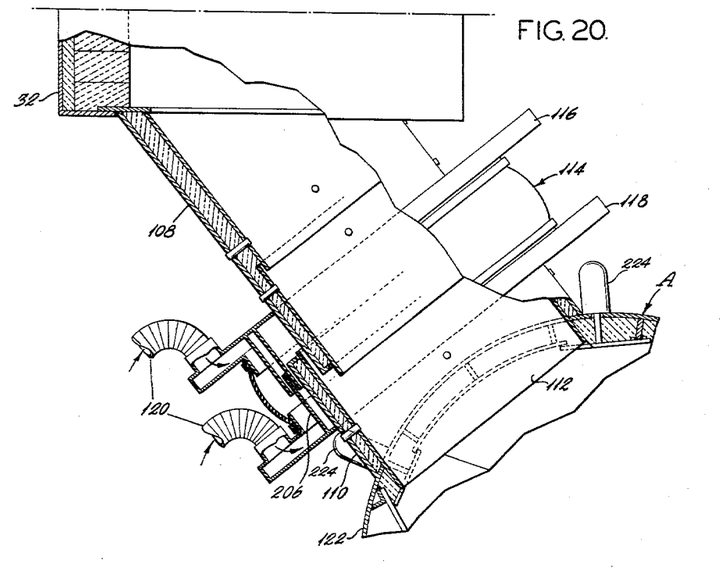
FIG. 20 is an enlarged fragmentary sectional view of the interconnection between the kiln and preheater sections taken on line 20—20 of FIG. 8.

The material after being discharged between the plates in the preheater passes into the restricted portion 32 and then into a feeder tube 108 interconnected with calciner input tube 110 leading into the inlet opening 112. The two tube sections 108 and 110 are interconnected by means of a flexible connector generally designated 114 and having at their two ends hollow plates 116, 118 into which cooling air passes from conduits 120. The flexible connector is in itself unique and of such a construction to withstand the heat and movement to which subjected as will be described with reference to FIG. 20.

The calciner section A includes a generally cylindrically shaped calciner 122 consisting of another cylindrical shell 124 of good grade steel. One end is closed by an end closure 126 consisting of inner and outer shell members 128 and 130 between which is interposed a layer of insulating material 132, and a manhole generally designated 134 of a suitable type extends therethrough into the interior of the calciner. The end closure 126 is in proximity to the inlet openings of the calciner which is the cooler end, and has a construction different from that at the discharge end as will be described hereinafter, and which has a different type of closure to permit for expansion and contraction as also replacement of various components.

The calciner is mounted for vibratory or reciprocatory motion substantially along a line indicated at 136 in FIG. 14 as shown by arrow 138 by means to be hereinafter described. The vibration or reciprocation of the support is a motion substantially in a straight line or in an arc closely approximating a straight line motion. The motion preferably is such that the slope of the bed support remains substantially constant or sufficiently close thereto that the bed of material is periodically impelled upwardly away from the support or spacedly displaced with respect to the support and returns by gravity onto the support resulting in an intermixing action of the pieces of material comprising the bed. The calciner can be mounted in various ways but preferably so that sideways or twisting movement is prevented and only a substantially straight line movement is permitted. One desirable manner of accomplishing this consists of a plurality of spaced A-shaped frames 140 formed of I-beams or the like and with the front members 142 thereof being parallel to the line of movement 136 of the kiln. Roller supports such as at 144 can be secured to the front members 142 at two spaced positions and carry roller tracks 146 thereon. The roller tracks include upstanding spaced slotted plates 148 in which the trunions 150 of rollers 152 are rotatably mounted and due to the elongation of the slot can move up or down along the line of movement of the calciner.

The calciner supports 154 are secured at their upper ends to the outer shell of the calciner and have secured thereto plates 156 on which are secured roller bearing plates 158 on which the rollers roll and in conjunction with the lower track upon movement. A rubber bumper 160 is secured on each of the supports 144 and operate in conjunction with stops 162 in the nature of brackets affixed to the members 154 to absorb energy at the end of the stroke and aid in initiating the return stroke. These can also be replaced by air springs or other sutiable devices.

Figures 14, 15, 16, 17, 18, 19:
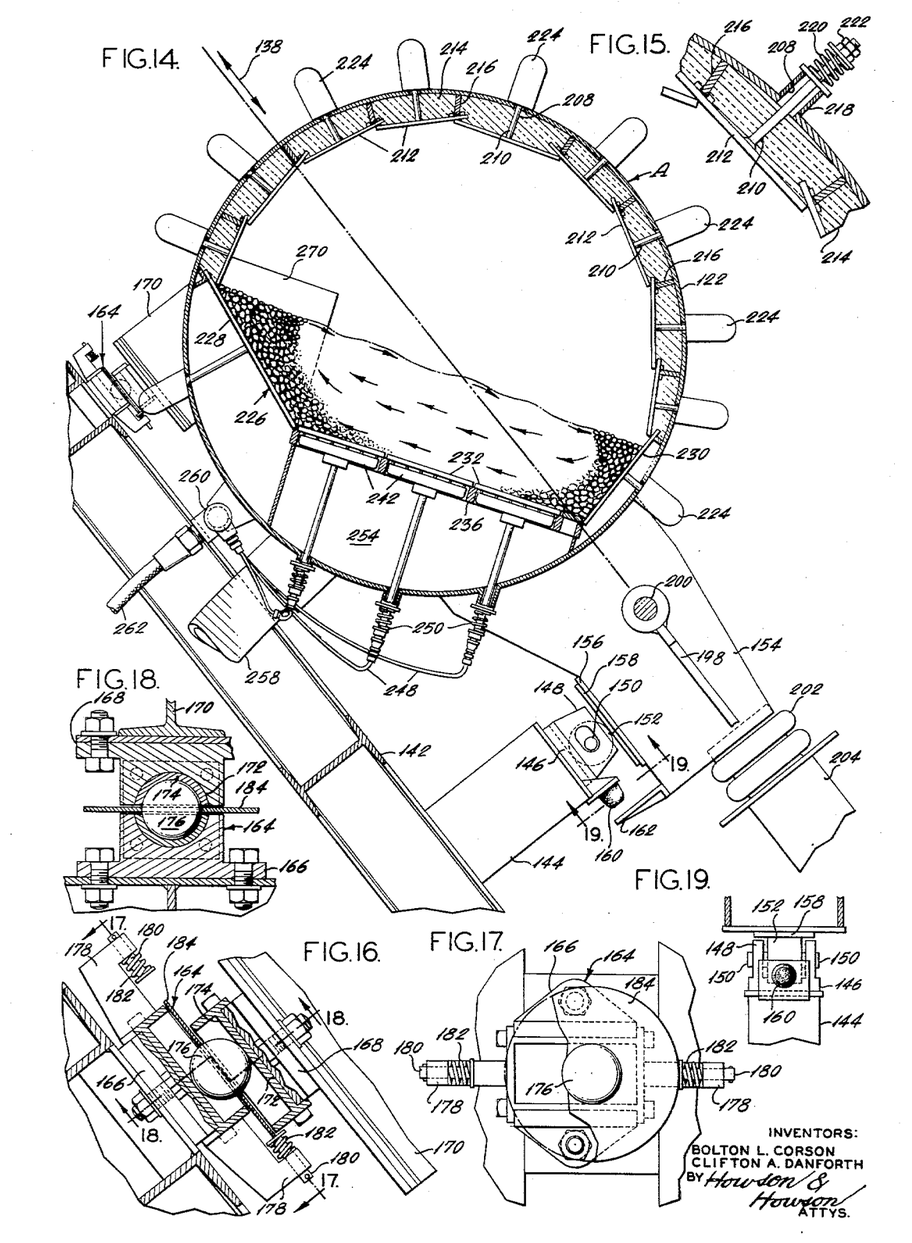
FIG. 14 is a cross-sectional view, on an enlarged scale, taken on line 14—14 of FIG. 8.
FIG. 15 is an enlarged fragmentary view of the construction of the kiln body and attachment of plates utilized therein and as schematically shown in FIG. 14.
FIG. 16 is an enlarged view of upper mounting means for the kiln as schematically shown in FIG. 14.
FIG. 17 is a sectional view taken on line 17—17 of FIG. 16 and turned at 90° thereto.
FIG. 18 is a sectional view taken on line 18—18 of FIG. 16.
FIG. 19 is a view taken on line 19—19 of FIG. 14.

The upper support for the calciner generally designated 164 is of a different type, and shown in greater detail in FIGS. 16, 17 and 18. If desired, and preferably so, this type of support can be used for one of the lower supports instead of the roller type. Secured to the front member is a bearing support 166 and a corresponding one 168 is secured to member 170 secured to the calciner 122. Each of these bearing supports has a substantially semicylindrical groove 172 formed therein in which is secured a liner 174 forming a bearing surface also of semicircular configuration. A ball 176 which constitutes a bearing is inserted between the two semicircular liner or bearing surfaces for movement therein. Arms 178 having offset portions are provided at each end of the bearing supports and the offset portions carry moveably mounted pins 180 which are spring biased by springs 182 to inward position. A circular plate 184 having a circular opening therein, is mounted between the two halves of the bearings support and around the ball 176. This serves the purpose of maintaining the ball in a centered position by coaction with the spring biased pins 180, by engagement therewith, depending upon the position of one-half of the bearing support with respect to the other so that the ball will be maintained in an operative position. This type of support when used at two support positions positively prevents lateral displacement of the calciner upon movement and when this type supports are used positively prevent any displacement or angular twisting of the calciner, while permitting the rectilinear vibratory movement thereof as desired.

For vibratory movement of the calciner substantially along the line 136, a drive motor 186 is provided which is connected to transmission 188 and through pulleys interconnected by V belts 190 and 192 drives an eccentric drive member 194, the output shaft of which drives arm 196 which is secured to connector member 198 which in turn is secured to calciner supports 154 by pivotal connections 200. When motor 186 is activated, preferably at intermittent intervals, it will be seen that the calciner will be vibrated rapidly depending upon speed of the motor along line 136 in a substantially rectilinear movement. Rubber air cushions 202, of an air spring type, are interposed between calciner supports 154 and posts 204 to absorb shock forces at the downward terminal of movement as defined by the position of the eccentric since large masses are involved and large forces result from movement of the calciner and additionally serve to store energy and facilitate reverse movement.

Because of relative movement between the stationary preheater and the calciner, means must be provided at the flexible connector 114 to permit this relative motion. By reference to FIG. 20, this portion of the apparatus is more clearly understood. It will be seen that inwardly of the flexible connector 114 and depending from the hollow plate 116, there is a channel member 204 whereas the hollow plate 118 has extending therefrom as single plate 206 which slidably extends into the channel 204. The calciner input tube 110 is disposed as to telescope over the lower end of feed tube 108 by in spaced relation therewith. Due to the arrangement of these various members, it will be seen that air entering the hollow plates through conduits 120 can effectively cool the various portions of this flexible interconnection and the arrangement also provides for the relative movement between moving and stationary portions of the apparatus. Heated gases at approximately 1800° F. are passing from the calciner up through this connection into the stationary preheater. Air pressure through conduits 120 is maintained greater than pressure in the calciner and serves effectively to cool contact points between metal portions and the rubber. Otherwise the rubber would burn and be destroyed. This construction is required because of the movement of the calciner with respect to the stationary preheater and additionally because of the high heats involved.

Calciner construction

The construction of the calciner per se will be more readily understood from FIGURES 10–15 inclusive. The outer shell 124 has a plurality of holes therethrough as at 208 through which pass bolts 210 and have secured on the ends thereof plates 212 of heat-resistant steel material. Interposed between the inner surface of the shell and the plates there is insulating material 214 of high-resistant properties. The plates 212, as shown in FIG. 14, are in overlapped relationship and spacers 216 secured to the shell positively position one end of the plates. The bolts 210 have their outer ends passing through tubular members 218 and springs 220 are interposed between the outer end of member 218 and nuts 222 on the ends of the bolts to floatingly mount the bolts and thereby the plates. This construction permits movement of the plates upon expansion and contraction caused by heat in the kiln. This mechanism can be used either without a cap over the end of the bolt, as shown in FIG. 15, or if desired, caps 224 can be placed over the ends of the bolts. It will be noted that this arrangement of plates is only in the upper portion of the calciner since this is the area in which high heat conditions will exist.

Figure 10:
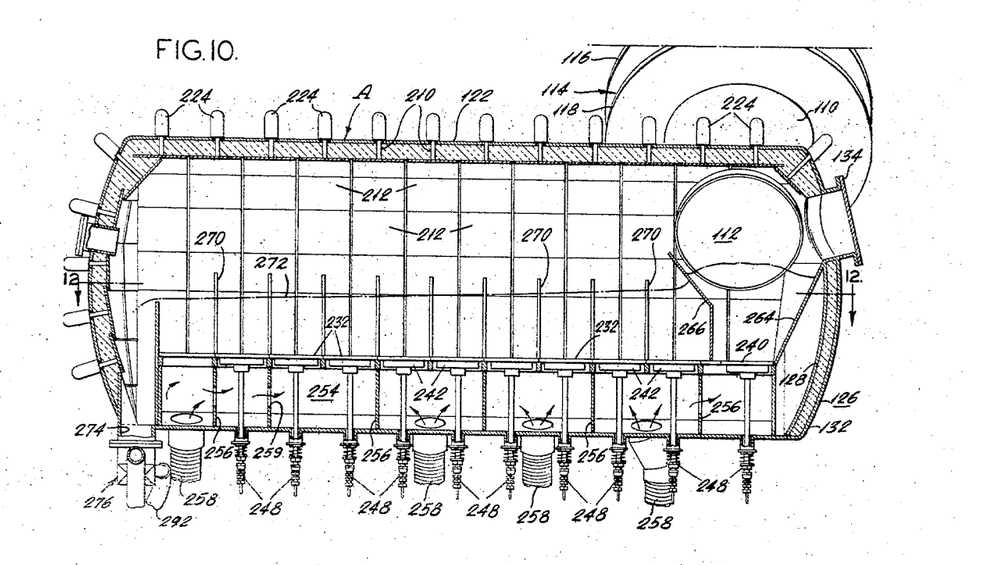
FIG. 10 is a sectional view taken on line 10—10 of FIG. 1.
Figure 11:
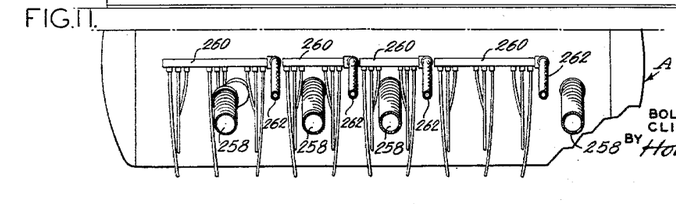
FIG. 11 is a view taken on line 11—11 of FIG. 1 of fuel and air distribution and inlet portions of the apparatus.
Figure 12:
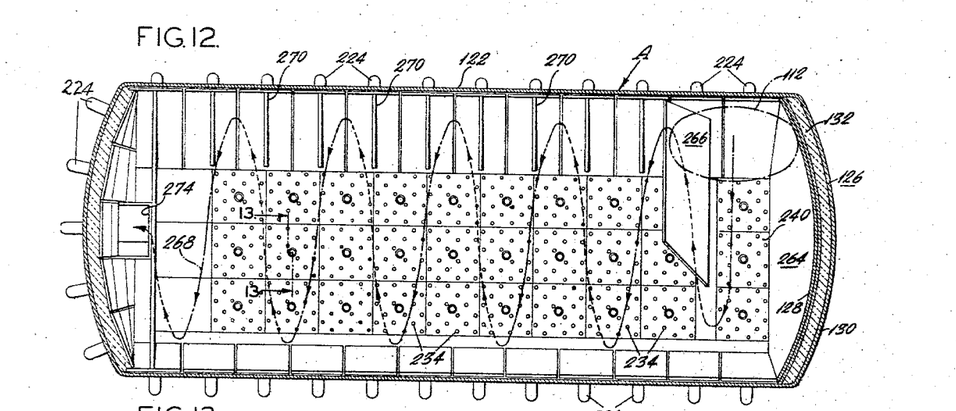
FIG. 12 is a sectional plan view taken on line 12—12 of FIG. 10.
Figure 13:
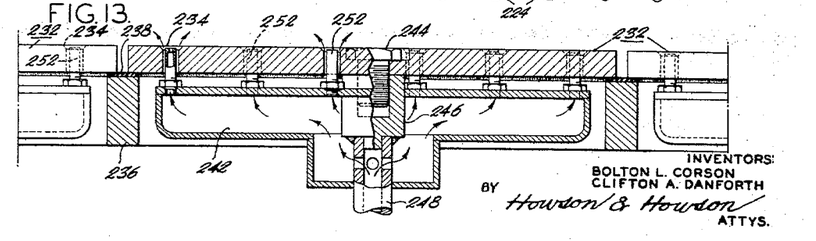
FIG. 13 is an enlarged fragmentary view taken on line 13—13 of FIG. 12 showing a bed support and air and fuel inlet and distribution means as applied to a single pad utilized in the support.

A trough generally designated 226 is mounted within the shell and serves as a material support for a bed of material to be calcined. This trough includes rear plate members 228 secured within the shell by bolts 210 in a manner similar to the plates 212. A front surface or lower end of the trough is formed by plates 230 mounted in a like manner by bolts 210. The bottom or lower surface of the trough is formed for the most part by bed plates 232 having a plurality of holes 234 therethrough. It will be seen from FIG. 12 that a plurality of individual and separate bed plates are utilized and which are supported by a support grid 236 with the interposition between the members forming the support grid and the bottoms of the bed plates, of resilient refractory bed plate supports and seal members 238. The individual bed plates are spaced from one another and the arrangement provides for expansion and contraction of the individual members under varying heat conditions whereas if the entire bottom support or bottom surface of the trough were formed as a solid unit cracking might otherwise occur. It will be seen from FIG. 12 that the main portion of the trough bottom consists of nine rows of three bed plates each, with the addition of a tenth set of three indicated at 240 which is at the inlet end of the calciner substantially below inlet opening 112. Hollow burner plates 242 are mounted on and supported below each bed plate by means of bolts 244 in screw-threaded engagement in threaded members 246 secured on the ends of a gas conduits 248 which mount the burner plates. These gas conduits 248 are mounted by spring loading devices 250 engaged with a portion exteriorly of the shell as seen in FIG. 10 to hold the individual bed plates down but permit resilient movement thereof in a manner similar to the plates 212.

A plurality of gas burner jets 252 are mounted on the top of burner plates 242 in open engagement therewith and extend into the holes 234 in the bed plate but terminating below the top surface thereof. It will be seen that the outer periphery of these jets are spaced from the inner periphery of the openings to permit air to pass therebetween after passing around the burner plates. It will also be apparent from FIG. 12 that at the outlet end or discharge end of the kiln, a row of burners or bed plates are omitted, this being the hot end as distinguished from the inlet end.

It will be noted from FIGS. 10 and 14 that an open chamber 254 is provided below the trough 226 in the nature of a plenum chamber with webs 256 at spaced intervals secure to the inner surface of the shell and serving to support the support grid members 236. Air conduits 258 connected to a suitable source of air supply, not shown, open into chamber 254 to provide for a flow of combustion supporting air into the chamber and thence around the burner plates and through the space between the jets and the inner surface of the holes to support combustion. Certain of the webs 256 have openings at 259 to permit air flow through the entire chamber.

A plurality of gas manifolds 260 are connected to the exterior of the shell into each of which gas supply conduits 262 are connected and which are connected to a gas supply source, not shown. It will be seen from FIG. 11 that each of the manifolds serves to supply three sets of three gas lines 248 which in turn each serve one of the burner plates. Due to this arrangement, it is possible to regulate the amount of heat along the length of the bed support to have varying degrees of heat in different zones of the overall calcining zone. Under normal operation, more gas would be supplied at the inlet end than at the let end due to the latter being a hotter zone under operating conditions. Manifestly fuels other than gas can be used such, for example, as oil or coal.

Figure 21:
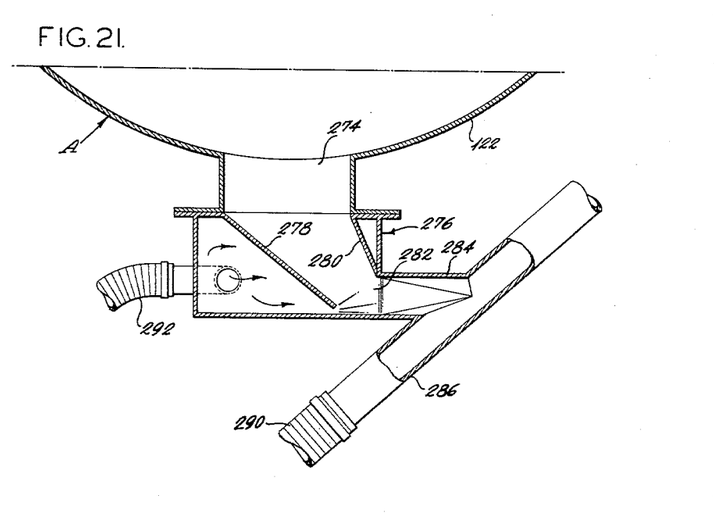
FIG. 21 is an enlarged fragmentary sectional view taken on line 21—21 of FIG. 8 showing details of the exhaust for material which has been calcined.

At the inlet end of the calciner, a baffle plate 264 is provided to direct material entering through inlet opening 112 toward the discharge end of the calciner and this baffle extends entirely across the interior of the kiln. A second baffle plate 266 is spaced from the first baffle plate 264 and extends only partially across the calciner. This serves the purpose of preventing material from shortcutting the desired flow path which is in the form of a flat helix as shown by the line 268 and arrows thereon. Additional plates 270 are mounted along the rear plates 228 in order to insure proper flow through the calciner. In FIG. 10 the approximate material level is indicated by broken line 272. It will be noted that substantially below inlet opening 112, the material will tend to build up and then have a slightly decreasing depth as it passes towards the discharge end. The rate of inlet feed will govern the pass through time of material in the bed upon vibration of the kiln due to the additional weight of material at the inlet end which forces the bed of material toward the discharge end. The discharge takes place through a discharge opening 274 (FIG. 21) through which material passes into discharge box 276 in which a guide funnel is formed by plates 278 and 280 terminating in a slot at 282. A neck portion 284 of discharge box 276 connects into air pressure line 286 connected to a source of air under pressure, not shown, and a valve 288 is provided for regulating pressure in the line. It will be noted that flexible portions 290 are provided in various of the conduits because of the movement and vibration which occurs. A bypass conduit 292 is connected into conduit 286 and opens into discharge box 276 rearwardly of the plate 278. It will be seen that the bottom end of plate 278 is spaced above the bottom of box 276 and in operation, material falling through discharge opening 274 will drop down to slot 282 where the discharge through the upper end of pipe 286 will be assisted by flow of air beneatth the bottom of plate 278. The discharge pipe is designated as 294 for the calcine material and a section 296 is provided to compensate for movement of the kiln with respect to a stationary portion of the discharge pipe 294.

In operation, raw material is passed into the preheater section where it is treated as explained hereinbefore and thence in through inlet opening 112 into the calciner. The calciner unit is then intermittently vibrated for short periods of time with great rapidity and due to the bumper and stop 160 and 162 in conjunction with the operation of air cushion 202, will serve to shake the material and move it upwardly away from the surfaces forming the lower and rear portions of the trough. This causes material to gradually move along the trough in the direction shown by arrows in FIG. 14 toward the rear, while at the same time insuring that fines will not collect along the lower area and gradually the top layer or two of material at the top of the bed will sluff off and roll rapidly down toward the lower end of the bed and the top of forward plate 230 where, due to motion in vibration, a slight gap occurs at vibration intervals and material rolls thereinto for recycling. This action causes a complete intermixing of material in the bed on the trough and at the same time a gradual movement from inlet to discharge end due to the additional weight of material at the inlet end will occur. At the same time, gas and air or other combustion supporting mediums are fed into the material in the bed for combustion therein for burning of the limestone. The motion in the flat helix and gradual movement through the bed insure substantially uniform treatment of each and every piece for proper calcining thereof. Speed of movement can be controlled by inlet feed and vibration frequencies and combustion in different areas or zones can likewise be regulated so that the desired uniformity is reached. The preheater is desirable although not necessary, but when used will bring the temperature of the pieces up to the flash point i.e. above that of gas for example which is about 1200° F. Otherwise if fresh cold material is fed in, the burning might gradually stop since the temperature of the pieces should be above the combustion temperature of the fuel used for most efficient operation.

It is to be understood that minor changes and modifications can be made without departing from the spirit and scope of the invention as defined in and limited solely by the appended claims.

We claim:
1. The method of calcining pieces of mineral material comprising preheating the pieces of material, introducing the preheated material into one end of an elongated generally horizontal calcining zone to form a particulate mass therein, introducing a combustible fuel mixture into and through the particulate mass in said zone, and imparting a reciprocating vibratory motion to the mass in said zone in a direction generally normal to the axis thereof and at a frequency to intermix the pieces of material and in conjunction with the introduction of the pieces of material into said zone to effect conveyance of the pieces through the zone, the said pieces of material being pre-heated to a temperature sufficient to cause ignition of the fuel mixture introduced into the particulate mass in said zone and thereby uniformly calcine the pieces of the particulate mass in the zone while being intermixed and conveyed through the zone from the inlet to the outlet thereof.

2. The method claimed in claim 1 wherein the material which is preheated and introduced into the calcining zone consists of pieces of limestone.

3. The method claimed in claim 1 wherein a gaseous fuel mixture is introduced into and through the particulate mass in the calcining zone.

4. The method claimed in claim 1 wherein the reciprocating vibratory motion is imparted to the particulate mass in the calcining zone intermittently and the periods of vibratory motion imparted to the mass are of substantially shorter duration than the periods in which no vibratory motion is imparted to the mass so that calcining of the particulate mass of material occurs primarily during periods of non-vibration of the mass.

5. The method claimed in claim 1 wherein the pieces of material are preheated to a temperature sufficiently high to ignite the fuel mixture on the surfaces of the pieces of material introduced into the calcining zone.

6. The method claimed in claim 1 wherein the reciprocating vibratory motion is imparted to the mass in the calcining zone at an angle of inclination to the horizontal and at a frequency operable to impel the pieces of material in said mass in an upward direction and cause the uppermost pieces thereof to roll downwardly over the surface of the mass and thereby effect through intermixing of the pieces of material.

7. The method claimed in claim 4, including the steps of selectively controlling the rate of introduction of the pieces of the material into the calcining zone and the frequency of the reciprocating vibratory motion imparted to the particulate mass in the calcining zone to thereby regulate the processing time of the pieces of the material in the calcining zone.

8. The method claimed in claim 1, wherein preheating of the pieces of material is effected at least in part by the hot combustion gases from the calcining zone.

9. The method claimed in claim 1, including decreasing from the inlet end to the outlet end of the calcining zone the quantity of the combustible fuel mixture introduced into and through the particulate mass in said zone.

10. The method claimed in claim 1, including supporting the particulate mass on an inclined surface of the calcining zone and imparting reciprocating vibratory motion to the supported mass to actuate the entire mass in an upward direction along the inclined surface and cause a thin layer of material pieces to slough off and roll downwardly over the mass to thereby effectively intermix the pieces of material in the mass.

11. Apparatus for calcining pieces of mineral material comprising a preheater for said pieces of material fixedly mounted in an elevated position, means for defining an elongated generally horizontal calcining zone disposed at a lever below said preheater, means in the preheater operable to regulate discharge of the material from the preheater, a conduit between the bottom of the preheater and one end of the calcining zone for gravity flow of material from the preheater to said one end of said calcining zone to introduce and form a particulate mass of the pieces of material in the calcining zone, means for introducing a combustible fuel mixture into and through the particulate mass of material in said zone, means to impart reciprocating vibratory motion intermittently to the calcining zone and material therein in a direction generally normal to the axis thereof and at a frequency operable to intermix the pieces of material and convey the same progressively through the calcining zone, means to conduct the combustion gases from the calcining zone to and through the preheater to thereby preheat the pieces of material prior to entering the calcining zone, and means to regulate the frequency and intermittent periods of vibratory motion imparted to the calcining zone and material operable in conjunction with the rate of introduction of the material to said zone to control the rate of travel of the pieces of material through the zone.

12. Apparatus as claimed in claim 11 wherein a flexible section is provided in the conduit from the preheater to the calcining zone to isolate the preheater from the vibratory motion imparted to said zone.

13. Apparatus as claimed in claim 11 wherein the means for introducing a combustible fuel mixture into and through the particulate mass of the material in the calcining zone comprises a plurality of separately controllable units arranged lengthwise of the calcining zone, and means for selectively controlling the individual units to regulate the quantity of combustible fuel mixture introduced by each unit into the calcining zone to provide variable heat zones longitudinally in the calcining zone.

14. Apparatus as claimed in claim 11 wherein the means defining the calcining zone comprises a fluid pervious material support of trough-shaped configuration, and the reciprocating vibratory motion is imparted to the material support in a direction at an inclined angle to the horizontal thereby to cause the material in the trough to be impelled upwardly away from the support toward the rear thereof and then roll downwardly over the surface of the material remaining in the trough to thoroughly intermix the pieces of material.

15. Apparatus as claimed in claim 14 wherein the trough-shaped material support is provided with inclined bottom and rear surfaces for supporting a bed of the material and the reciprocating vibratory motion imparted thereto operates to impel the material in the trough upwardly away from the support and upwardly on the inclined bottom and rear surfaces thereof so that the pieces of material reaching the upper end of the rear surface of the trough roll downwardly over the surface of the bed of material in the trough to thoroughly intermix the pieces of material.

16. Apparatus as claimed in claim 15 wherein baffle plates are provided in the trough-shaped material support extending outwardly from the rear surface thereof and upwardly from the bottom surface thereof above the top of the bed of material, said baffle plates being operable to cause the pieces of material to travel in a helical path as they progress from the inlet to the outlet of the calcining zone.

17. Apparatus as claimed in claim 12 wherein means are provided for air-cooling the connection between the flexible section and the preheater and calcining zone.

References Cited by the Examiner
UNITED STATES PATENTS

| | | | |
|---|---|---|---|
| 2,091,850 | 8/1937 | Gohre | 263—33 X |
| 2,786,665 | 3/1957 | Swenson | 263—27 |
| 2,941,791 | 6/1960 | Wienert | 263—33 |
| 3,022,988 | 2/1962 | Corson et al. | 263—21 |

WILLIAM L. O'DEA, *Primary Examiner.*

JOHN J. CAMBY, *Examiner.*

D. A. TAMBURRO, *Assistant Examiner.*